United States Patent
Chung et al.

(10) Patent No.: US 7,809,227 B2
(45) Date of Patent: Oct. 5, 2010

(54) OPTICAL FIBER, AND OPTICAL ACCESS NETWORK, LOCAL AREA NETWORK AND OPTICAL PARTS FOR COMMUNICATION, WHICH USE THE OPTICAL FIBER

(75) Inventors: Yun Chur Chung, Yuseong-gu (KR); Jun Haeng Lee, Soe-gu (KR); Eui Seung Son, Soengnam-si (KR); Jang won Chae, Anyang-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 11/918,064

(22) PCT Filed: Sep. 23, 2005

(86) PCT No.: PCT/KR2005/003160

§ 371 (c)(1), (2), (4) Date: Oct. 9, 2007

(87) PCT Pub. No.: WO2006/109910

PCT Pub. Date: Oct. 19, 2006

(65) Prior Publication Data

US 2009/0074351 A1    Mar. 19, 2009

(30) Foreign Application Priority Data

Apr. 13, 2005    (KR) .................. 10-2005-0030774

(51) Int. Cl.
*G02B 6/02* (2006.01)

(52) U.S. Cl. ...................................... 385/126

(58) Field of Classification Search .................. 385/126
See application file for complete search history.

(56) References Cited

U.S. PATENT DOCUMENTS

| | | | |
|---|---|---|---|
| 6,370,300 B1 * | 4/2002 | Eggleton et al. | 385/37 |
| 7,171,074 B2 * | 1/2007 | DiGiovanni et al. | 385/28 |
| 2002/0003926 A1 | 1/2002 | Enomoto et al. | |

FOREIGN PATENT DOCUMENTS

JP    A-2001-133651    5/2001

* cited by examiner

*Primary Examiner*—Jerry T Rahll
(74) *Attorney, Agent, or Firm*—Oliff & Berridge, PLC

(57) ABSTRACT

An optical fiber, and an optical access network, a local area network and optical parts for communication, which uses the optical fiber, are disclosed. The optical fiber whose core diameter is 10 μm~40 μm has at least two propagation modes in a wavelength over 1200 nm. The optical fiber according to the present invention can reduce packaging costs for optical components, since cross-sectional area of the core is large, compared with the prior art technique adopting a single mode optical fiber, and can transmit ultra-high speed data a relatively long distance, since the mode number and modal dispersion effect of the optical fiber is relatively small, compared with the prior art multimode optical fiber. Also, when using the optical fiber according to the present invention, the optical subscriber network and the local area network can be cost-effectively implemented. In addition, when adopting the optical fiber according to the present invention, productivity of optical components for communication can be improved, costs for an optical component can be reduced and quality of the optical component can be improved.

18 Claims, 5 Drawing Sheets

(a)

(b)

OPTICAL FIBER, AND OPTICAL ACCESS NETWORK, LOCAL AREA NETWORK AND OPTICAL PARTS FOR COMMUNICATION, WHICH USE THE OPTICAL FIBER

TECHNICAL FIELD

The present invention relates to an optical technology, and more particularly to an optical fiber capable of resolving the problems in prior art single mode and multi mode optical fibers, an optical access network and a local area network, and optical parts for communication, which use the optical fiber.

BACKGROUND ART

Recently, as the Internet and various data services are rapidly increased, a large amount of transmission capacity is needed in a subscriber network, and a local area network (LAN). In order to comply with such requirement, an optical access network and a local area network have attracted considerable attention. Here, the optical subscriber network is constructed on the basis of single mode optical fibers which are connected to houses to provide services thereto, which is called Fiber-To-The-Home (FTTH). Also, the local area network based on a multi-mode optical fiber improves performance of the prior art multi-mode optical fiber, and can transmit a fast signal of 10 Gb/s to a distance of 300 m using an electrical compensation device and an offset launching technology of a light source.

FIG. 1(a) and FIG. 1(b) are refractive index profiles of a single mode optical fiber and a multi-mode optical fiber used in the prior art optical communication network, respectively.

In FIG. 1(a) and FIG. 1(b), n1 denotes the maximum refractive index in a core center, n2 denotes a refractive index of a cladding, and n0 denotes the refractive index of air. Also, a shows a core radius, and b shows a radius of an optical fiber including a core and a cladding.

The optical access network based on the FTTH, which employs a single mode optical fiber of FIG. 1(a), is superior to an xDSL network using copper wiring, regarding transmission capacity and transmission quality, however, it has disadvantages in that, since it utilizes relatively expensive optical components, it is not cost-effective. Namely, since the core diameter of the prior art single mode optical fiber is relatively very small, about 8 μm, it requires relatively much packaging cost such that outputs of optical components can be effectively coupled to the optical fibers. Such packaging cost can be largely reduced, as a multi-mode optical fiber having a relatively large diameter, such as 50 μm or 62.5 μm, as shown in FIG. 1(b), is employed. However, when a multi-mode optical fiber is used, since there are a plurality of modes propagating through the optical fiber, and modal dispersion is large due to delay between modes, the prior art network has disadvantage in that ultra-high speed data over 10 Gb/s cannot be transmitted long distances.

Therefore, research into a network structure has been performed to reduce network construction costs based on the single mode-optical fiber in the prior art optical access network. Recently, research has been conducted into light sources for economically constructing a network and means for economically implementing components adopted in a network. Even though research into cost reduction has been conducting, it must be limited as long as prices for optical components is not reduced. On the other hand, an offset launching technology and various electrical compensation devices have been researched such that ultra-high speed data of 10 Gb/s based on a multi-mode optical fiber can be transmitted 300 m in the local area network, however, such endeavor is focused only on performance improvement of a transmission system without cost consideration.

DISCLOSURE

[Technical Problem]

Therefore, the present invention has been made in view of the above problems, and it is an object of the present invention to provide an optical fiber which is capable of reducing packaging cost for optical components, compared with the prior art technique adopting a single mode optical fiber, and transmitting ultra-high speed data a relatively long distance, since the mode number and modal dispersion effect of the optical fiber is relatively small, compared with the prior art multi-mode optical fiber.

It is another object of the present invention to provide an optical access network, a local area network and an optical component for communication, which use the optical fiber according the first object of the present invention.

[Technical Solution]

In accordance with an aspect of the present invention, the above and other objects can be accomplished by the provision of an optical fiber whose core diameter is 10~40 μm, wherein the optical fiber has at least two propagation modes in a wavelength over 1200 nm.

Preferably, the optical fiber has modal dispersion of less than 500 ps/km.

Preferably, the number of mode is two.

Preferably, the optical fiber has a refractive index which is described below:

$$n(r)=n_1[1-2\Delta(r/a)^g]^{1/2}, 0 \leq r \leq a$$

$$n(r)=n_1[1-2\Delta]^{1/2}, r \geq a$$

where, $n_1$ denotes a maximum refractive index at the core center, r denotes a radial distance from the core center to any point in the fiber, and g denotes a parameter showing a refractive index profile of a core, a denotes a core radius, and $\Delta$ denotes a parameter showing a difference between the maximum refractive index n1 at the core center and a refractive index $n_2$ in a cladding, in which $\Delta$ is $(n_1-n_2)/n_1$.

In accordance with another aspect of the present invention, the above and other objects can be accomplished by the provision of an optical access network connecting optical communication equipment using the optical fiber according to one aspect of the present invention.

Preferably, a central office and an optical network unit are connected to each other one to one using the optical fiber, and also the optical access network performs communication based on wavelength division multiplexed optical transmission, time division multiplexed optical transmission, and sub-carrier multiplexed optical transmission.

Preferably, the optical access network may further comprises electrical dispersion compensators, and employ error correction code.

In accordance with still another aspect of the present invention, the above and other objects can be accomplished by the provision of a local area network, wherein optical communication equipment is connected to each other using an optical fiber according to one aspect of the present invention.

Preferably, the network may further comprise electrical dispersion compensators, and employ error correction code.

In accordance with yet another aspect of the present invention, the above and other objects can be accomplished by the provision of an optical parts for communication, wherein the optical parts are connected to each other using the optical fibers according to one aspect of the present invention.

Preferably, the optical component is a passive component or an active component.

[Advantageous Effects]

The optical fiber according to the present invention can reduce packaging costs for optical components, since cross-sectional area of the core is large, compared with the prior art technique adopting a single mode optical fiber, and can transmit ultra-high speed data a relatively long distance, since the mode number and modal dispersion effect of the optical fiber is relatively small, compared with the prior art multimode optical fiber.

Also, when using the optical fiber according to the present invention, the optical access network and the local area network can be cost-effectively implemented.

In addition, when adopting the optical fiber according to the present invention, productivity of optical components for communication can be improved, costs for an optical component can be reduced and quality of the optical component can be improved.

DESCRIPTION OF DRAWINGS

The above and other objects, features and other advantages of the present invention will be more clearly understood from the following detailed description taken in conjunction with the accompanying drawings, in which.

BEST MODE

An optical fiber according to the present invention has characteristics in that, as its core diameter is enlarged, for example, 10 μm~40 μm, its cross-sectional area, compared with the prior art single mode optical fiber, thereby easily packaging optical components, and the number of mode propagated at a wavelength of over 1200 nm is decreased to at least two, such that the number of mode can be smaller than that of the prior art multimode optical fiber. Especially, the optical fiber according to the present invention has characteristics in that its modal dispersion is less than 500 ps/km. The optical fiber according to the present invention has a refractive index expressed by the following equations (1). The mode number can be decreased below that of the prior art optical fiber as the core diameter and a parameter Δ are reduced, in which the parameter Δ shows a difference between the maximum refractive index at the core center and a refractive index in a cladding. Also, modal dispersion can be reduced below that of the prior art optical fiber as the parameter Δ and a parameter g are controlled, in which the parameter g shows a refractive index profile of a core.

$$n(r)=n_1[1-2\Delta(r/a)^g]^{1/2}, 0 \leq r \leq a$$

$$n(r)=n_1[1-2\Delta]^{1/2}, r \geq a \qquad (1)$$

where, $n_1$ denotes a maximum refractive index at the core center, r denotes a radial distance from the core center to any point in the fiber, and g denotes a parameter showing a refractive index profile of a core, a denotes a core radius, and Δ denotes a parameter showing a difference between the maximum refractive index n1 at the core center and a refractive index $n_2$ in a cladding, in which Δ is $(n_1-n_2)/n_1$.

With reference to the attached drawings, the preferred embodiments of the present invention are described in detail below. Since the embodiments are described based on an optical access network, and a local area network, etc., using the optical fiber according to the present invention which has advantages in that it can cost-effectively configure the networks, the scope of the present invention should not be limited thereto. Also, it is easily appreciated that various modifications additions and substitutions are possible without departing from the scope and spirit of the invention.

Embodiment 1

Figure 1:
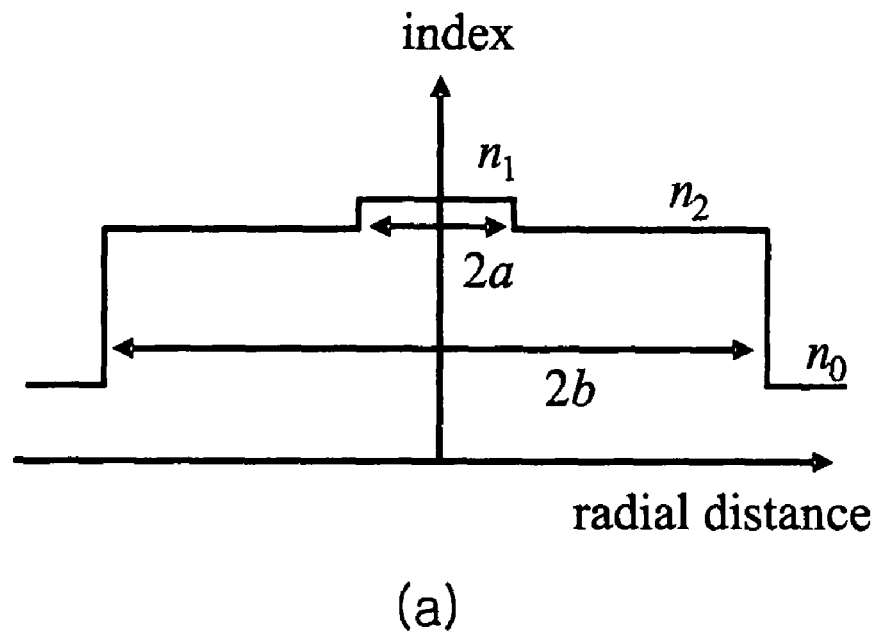
FIG. 1(a) and FIG. 1(b) are refractive index profiles of a single mode optical fiber and a multi-mode optical fiber used in the prior art optical communication network, respectively.
Figure 1:
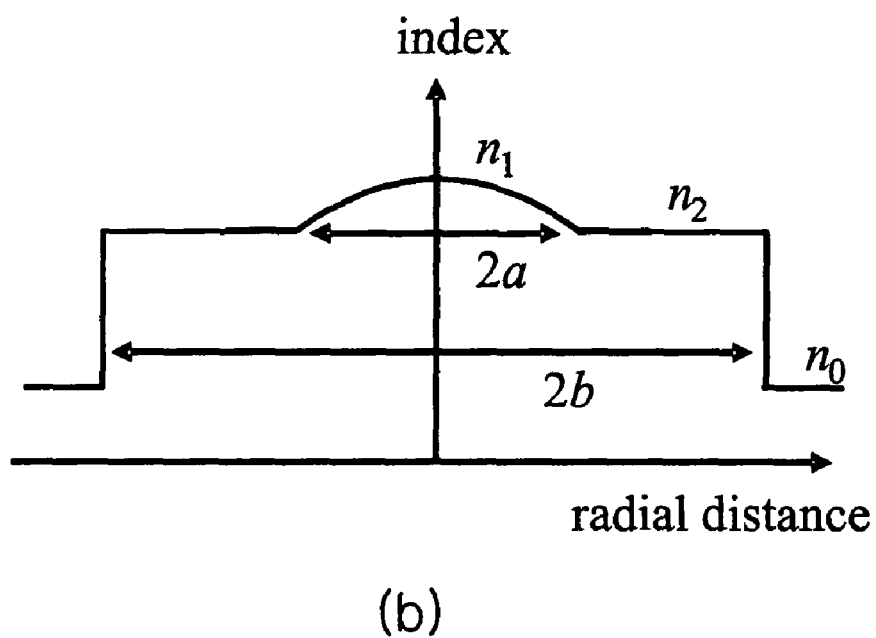
Figure 2:
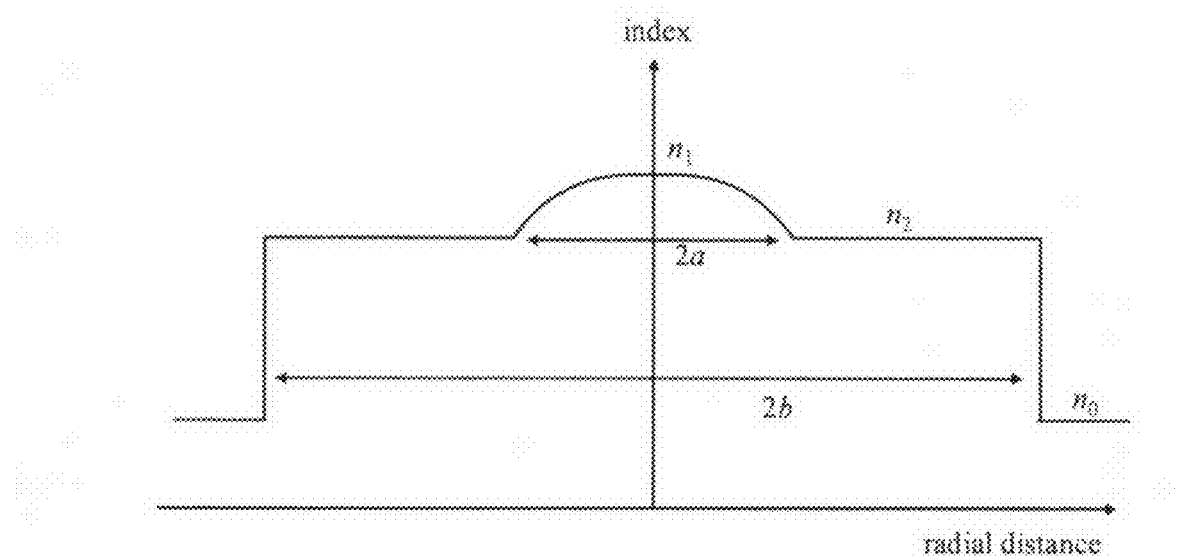
FIG. 2 is a view illustrating a refractive index profile of an optical fiber according to the present invention.

FIG. 2 is a view illustrating a refractive index profile of an optical fiber according to the present invention.

The refractive index profile is derived from equation (1) under the conditions that the core diameter, 2a, is 15~30 μm, the parameter, Δ, is 0.15%~0.45%, and the parameter, g, is 2.5~4.5.

Embodiment 2

Figure 3:
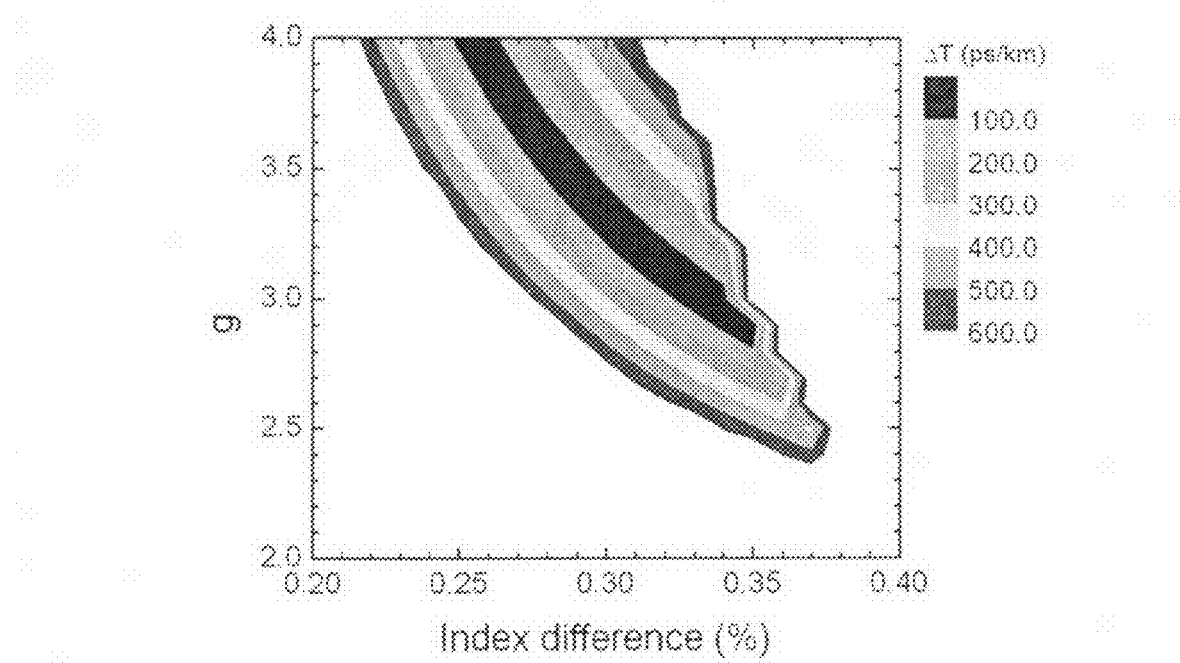
FIG. 3 is a view illustrating a graph measured through a simulation for modal dispersion according to a parameter Δ, which shows a difference between a maximum refractive index in the core center and a refractive index in a cladding, and a parameter g, which shows a refractive index profile of a core, in a state where the core diameter is 20 μm, the maximum refractive index is 1.46 in the core center, and a wavelength of a light source is 1550 nm.

FIG. 3 is a view illustrating a graph measured through a simulation for mode distribution according to a parameter Δ, which shows a difference between a maximum refractive index in the core center and a refractive index in a cladding, and a parameter g, which shows a refractive index profile of a core, in a state where the core diameter is 20 μm, the maximum refractive index is 1.46 in the core center, and a wavelength of a light source is 1550 nm;

As shown in the graph, the modal dispersion is described on the basis of ps/km. For example, when the parameter Δ is 0.33% and the parameter g is 3, the mode distribution is less than 100 ps/km. Therefore, since the core diameter of the optical fiber of the present invention is 2.5 times that of the prior art single mode optical fiber whose diameter is about 8 μm, packaging is easily performed. Also, since modal dispersion is relatively small, a data signal of 1 Gb/s can be transmitted over 5 km without an additional distribution compensation device. On the other hand, the mode number of the optical fiber according to the present invention is two.

Embodiment 3

Figure 4:
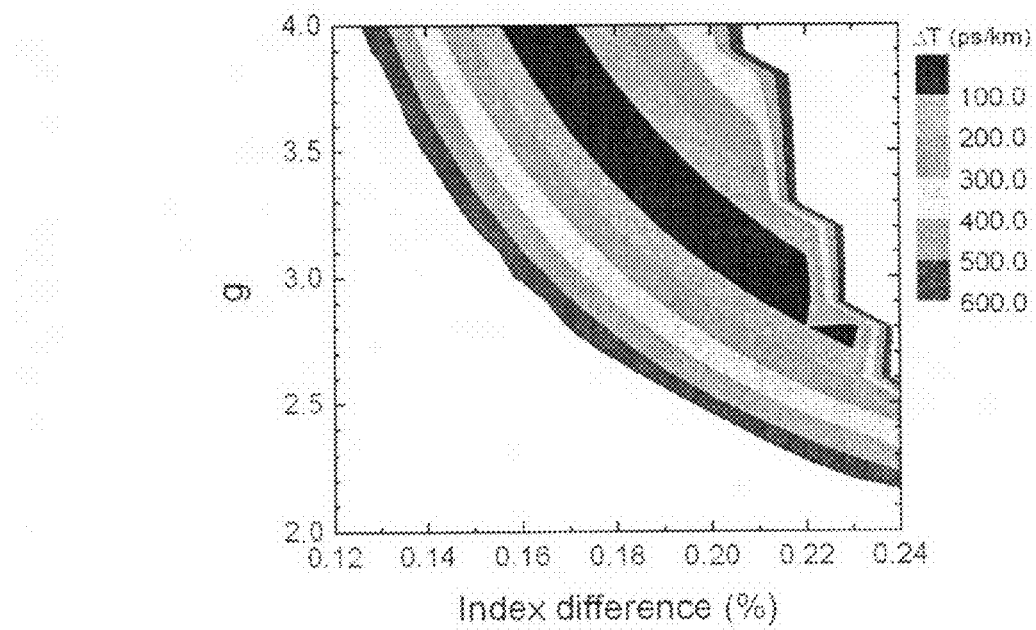
FIG. 4 is a view illustrating a graph measured through a simulation for modal dispersion according to a parameter Δ, which shows a difference between a maximum refractive index in the core center and a refractive index in a cladding, and a parameter g, which shows a refractive index profile of a core, in a state where the core diameter is 25 μm, the maximum refractive index is 1.46 in the core center, and a wavelength of a light source is 1550 nm.

FIG. 4 is a view illustrating a graph measured through a simulation for mode distribution according to a parameter Δ, which shows a difference between a maximum refractive index in the core center and a refractive index in a cladding, and a parameter g, which shows a refractive index profile of a core, in a state where the core diameter is 25 μm, the maximum refractive index is 1.46 in the core center, and a wavelength of a light source is 1550 nm.

As shown in the graph, the mode distribution is described on the basis of ps/km. For example, when the parameter Δ is 0.21% and the parameter g is 3, the modal dispersion is less than 100 ps/km. Therefore, like embodiment 2, embodiment 3 is operated such that a data signal of 1 Gb/s can be transmitted over 5 km without an additional distribution compensation device.

On the other hand, referring to FIGS. 3 and 4, when a light source with a wavelength of 1500~1600 nm, under conditions that the core diameter is 17~28 μ, which is derived from manufacturing process on the basis of simulation results of FIGS. 3 and 4, the parameter Δ is 0.16~36%, and the parameter g is 2.6~3.6, then the mode distribution is less than 200 ps/km. Therefore, a data signal of 1 Gb/s can be transmitted over 3 km without an additional dispersion compensator.

Next, optical communication networks connecting optical communication equipment to each other using the above-described optical fibers are described. Description for the following embodiments of the present invention is based on the typical prior art optical communication network, since all the communication networks can be implemented to interconnect optical communication equipment using the above-mentioned optical fibers, the scope of the present invention should not be limited to the following embodiments.

Embodiment 4

Figure 5:
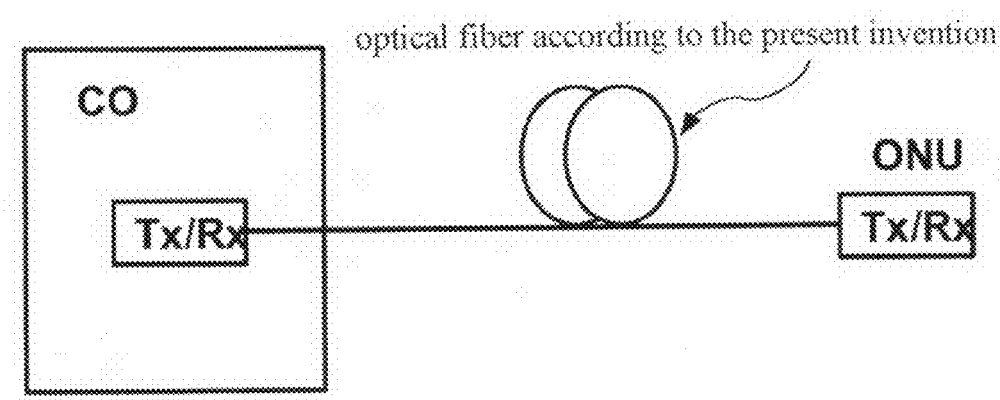
FIG. 5 is a view illustrating an optical subscriber network where a central office and a subscriber are connected to one anther using an optical fiber according to the present invention.

FIG. 5 is a view illustrating an optical access network where a central office and a subscriber are connected to one anther using an optical fiber according to the present invention.

Referring to FIG. 5, an optical subscriber network is configured such that a central office CO and an optical network unit ONU are connected to one another one-to-one through the optical fiber, in which the central office CO has a downstream transmitter and an upstream receiver and the optical network unit ONU has an upstream transmitter and a downstream receiver.

Embodiment 5

Figure 6:
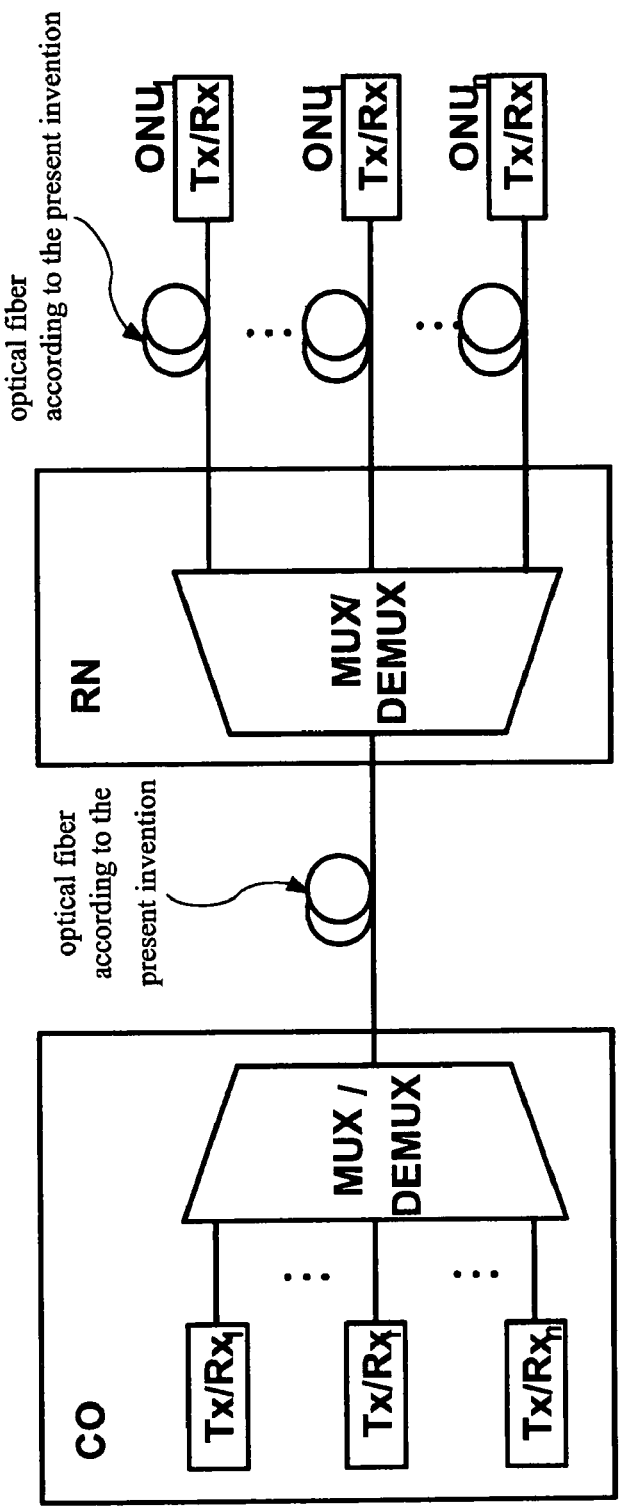
FIG. 6 is a view illustrating a wavelength division multiplexed passive optical network where optical communication equipment is connected to each other using an optical fiber according to the present invention.

FIG. 6 is a view illustrating a wavelength division multiplexed passive optical network (hereinafter, WDM PON) where optical communication equipment is interconnected using an optical fiber according to the present invention.

As shown in FIG. 6, the central office CO of the WDM PON installs a MUX/DEMUX therein such that it multiplexes downstream optical signals whose wavelengths are different from each other to transmit them thereto and receives upstream optical signals to demultiplex the received signals. A MUX/DEMUX is installed in a remote node RN. The MUX/DEMUX is connected to the MUX/DEMUX of the central office CO and to the optical network unit ONU of the subscriber terminal, such that it can receive downstream signals from the central base station based on wavelengths and demultiplex the signals to transmit the demultiplexed signals to the subscribers, and such that it can receive upstream optical signals whose wavelengths are different from each other from the subscriber terminals and demultiplex the received signals to transmit the demultiplexed signals to the central base station. Here, the MUX/DEMUXs between the central office and the remote node are connected to each other by the optical fiber according to the present invention, and the MUX/DEMUX of the remote node and the optical network unit of the subscriber terminal are also connected to each other by the optical fiber according to the present invention.

Embodiment 6

Figure 7:
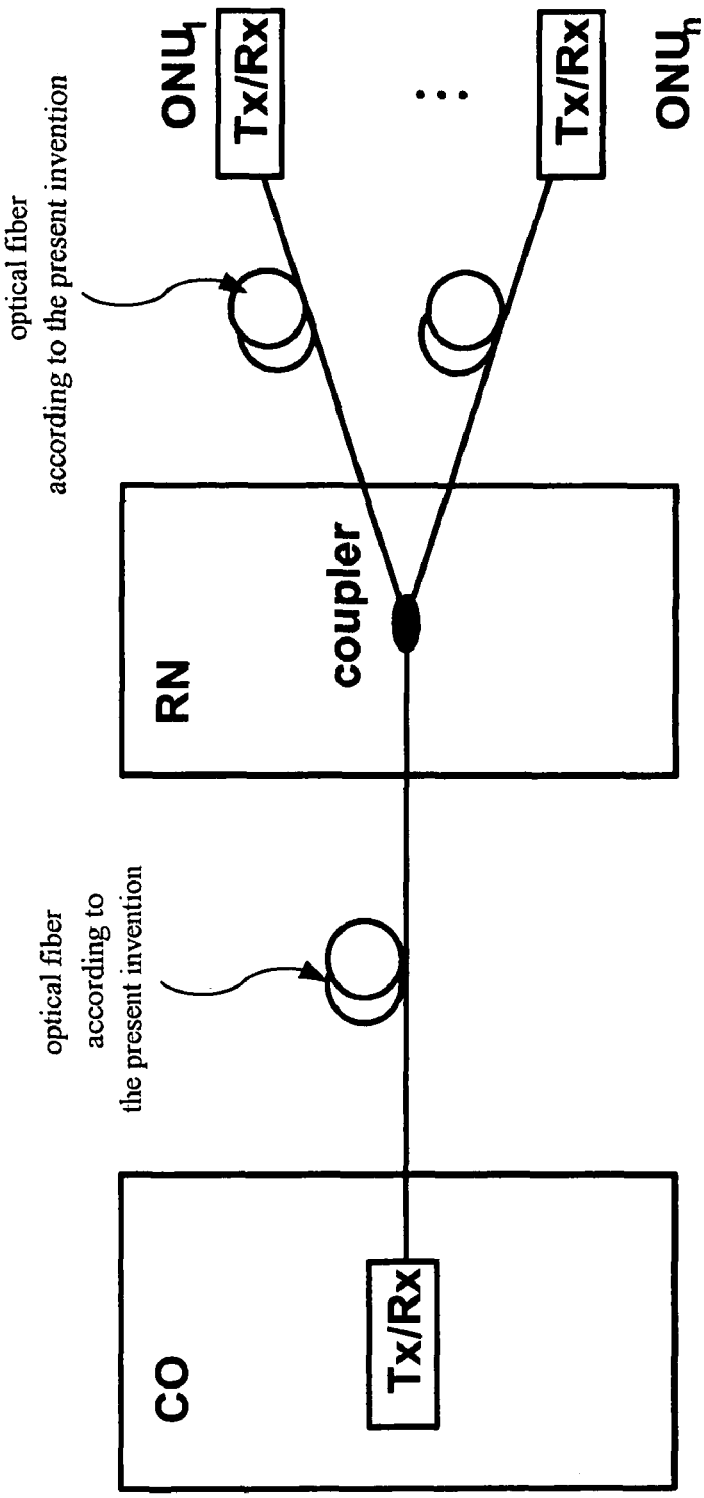
FIG. 7 is a view illustrating a time division multiplexed passive optical network where optical communication equipment is connected using an optical fiber according to the present invention.

FIG. 7 is a view illustrating a time division multiplexed passive optical network (hereinafter, TDM PON) where optical communication equipment is interconnected using an optical fiber according to the present invention.

With reference to FIG. 7, a downstream transmitter and an upstream transmitter are installed in the central office CO of the TDM PON. A remote node installs a coupler therein, in which the coupler is connected to an downstream transmitter and an upstream receiver of the central office, and to optical network units ONUs of a subscriber terminal, such that it can divide power downstream optical signals received from the central office and transmit them to the subscriber terminal, and such that it can combine the upstream optical signals received from the subscriber terminal to transmit them to the central office. Here, the downstream transmitter and the upstream receiver of the central office and the coupler of the remote node are connected to each other by the optical fiber according to the present invention, and the coupler of the remote node and the optical network units of the subscriber terminal are also connected to each other by the optical fiber according to the present invention.

Including the above-mentioned embodiments, an optical access network using subcarrier multiplexed optical transmission, an optical access which increases data transmission speed and transmission distance using an electrical dispersion compensator, or an optical access network which increases data transmission speed and transmission distance using an error correction code can interconnect optical equipment using the optical fiber according to the present invention. Also, a local area network as well as the optical access network, for example, a local area network, which increases data transmission speed and transmission distance using an electrical dispersion compensator, or a local area network, which increases data transmission speed and transmission distance using an error correction code, etc., are interconnected to optical communication equipment using the optical fiber according to the present invention. On the other hand, since it is appreciated that persons skilled in the art can implement the optical access networks and the local area networks using the optical fiber according to the present invention, detailed descriptions therefore are omitted in the present application.

As such, since it is easy to perform packaging and ultrahigh speed data can be transmitted a long distance without an additional dispersion compensator when the optical fiber according to the present invention is employed, the optical access network and the local area network are cost-effectively implemented.

The optical fiber according to the present invention can be applied to the above-mentioned communication networks, and also directly applied to optical parts for communication, as the prior art optical fiber interconnecting to some portions of the optical parts is replaced with the optical fiber according to the present invention. Here, the optical parts for communication includes passive components, such as, a coupler, a WDM coupler, an optical circulator, a MUX, a DEMUX or an optical connector, and active components, such as a light source including a laser diode or an light emitting diode, a semiconductor optical amplifier, an optical receiver or an optical transmitter. When the optical fiber according to the present invention is applied to the optical parts for communication, productivity for the optical parts can be improved. Therefore, the unit cost can be reduced and quality can be improved. On the other hand, since it is appreciated that persons skilled in the art can easily implement optical parts for communication using the optical fiber according to the present invention, detailed description of the implementation method is omitted in the present application.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An optical fiber whose core diameter is 10 μm~40 μm, wherein the optical fiber has at least two propagation modes in a wavelength over 1200 nm, and the optical fiber has a refractive index which is described below:

$$n(r)=n_1[1-2\Delta(r/a)^g]^{1/2}, 0 \leq r \leq a$$

$$n(r)=n_1[1-2\Delta]^{1/2}, r \geq a$$

where, $n_1$ denotes a maximum refractive index at the core center, r denotes a radial distance from the core center to any point in the fiber, and g denotes a parameter showing a refractive index profile of a core, a denotes a core radius, and Δ denotes a parameter showing a difference between the maximum refractive index n1 at the core center and a refractive index $n_2$ in a cladding, in which Δ is $(n_1-n_2)/n_1$.

2. The optical fiber as set forth in claim 1, wherein the parameter, Δ, is 0.15%~0.45%.

3. The optical fiber as set forth in claim 1, wherein the parameter, g, is 2.5~4.5.

4. The optical fiber as set forth in claim 1, wherein the core diameter is 17~28 μm, the parameter, Δ, is 0.16%~0.36%, and the parameter, g, is 2.6~3.6.

5. The optical fiber as set forth in claim 1, wherein the core diameter is 15~30 μm.

6. An optical fiber whose core diameter is 10 μm~40 μm, wherein the optical fiber has at least two propagation modes in a wavelength over 1200 nm, and the optical fiber has modal dispersion of less than 500 ps/km.

7. A local area network as set forth in claim 6, wherein optical communication equipment is connected to each other using an optical fiber.

8. The network as set forth in claim 7, further comprising an electrical dispersion compensators.

9. The network as set forth in claim 7, wherein the network employs error correction code, which is used to improve bit error rate property.

10. An optical access network connecting optical communication equipment using the optical fiber as set forth in claim 6.

11. The network as set forth in claim 10, wherein the optical access network performs communication based on wavelength division multiplexed optical transmission, time division multiplexed optical transmission, and subcarrier multiplexed optical transmission.

12. The network as set forth in claim 10, further comprising electrical dispersion compensators.

13. The network as set forth in claim 10, wherein the network employs an error correction code, which is used to improve bit error rate property.

14. The network as set forth in claim 10, wherein a central office and an optical network unit are connected to each other one to one using the optical fiber.

15. Optical parts for communication, wherein the optical parts are connected to each other using the optical fibers as set forth in claim 6.

16. The optical components as set forth in claim 15, wherein the optical component is a passive component or an active component.

17. The optical components as set forth in claim 16, wherein the passive component comprises a coupler, a WDM coupler, an optical circulator, a multiplexer, a demultiplexer or an optical connector.

18. The optical components as set forth in claim 16, wherein the active component comprises a light source, a semiconductor optical amplifier, an optical receiver or an optical transmitter.

* * * * *